3,003,966
POLYCRYSTALLINE GARNET MATERIALS

Le Grand G. Van Uitert, Morris Township, Morris County, N.J., assignor to Bell Telephone Laboratories, Incorporated, New York, N.Y., a corporation of New York
No Drawing. Filed Sept. 9, 1957, Ser. No. 682,573
5 Claims. (Cl. 252—62.5)

This invention relates to a method of making improved synthetic garnet materials, and to the garnets so produced. This invention relates particularly to a method of making synthetic garnets which are sinterable at moderate temperatures to give products of high density in which high electrical resistivity has been preserved, and to the materials so produced.

Substantial interest has recently been shown in the properties of a number of synthetic materials which are isostructural with naturally occurring garnet minerals. These synthetic garnets, which have the formula $A_3B_5O_{12}$, where A and B are trivalent metal ions, have magnetic properties valuable in the microwave arts, among others. For example, the synthetic garnets show very narrow line absorption at their ferromagnetic resonance frequency, and can be used in the construction of microwave devices such as resonators and isolators, and, generally, as the resonating element in other analogous waveguide structures.

In the manufacture of ceramic, that is, polycrystalline, bodies of these synthetic garnets, it has been found that in sintering the bodies at the elevated temperatures preferred for reaction of the component materials therein to a product of high density, a loss in electrical resistivity of the bodies is experienced. For example, in the preparation of yttrium-iron garnet, the sintering of yttrium-oxide-ferric oxide mixtures is best done at temperatures above 1350° C., where high density bodies are produced. However, the resistivity of the garnet falls off rapidly from a value of about $7(10^{10})$ ohm-centimeters, for a firing at 1325° C., when sintering is carried out in the preferred temperature range above 1325° C. This loss in resistivity is shown in Table I for yttrium-iron garnet samples, calcined in each case at 1100° C., and then sintered at one of a series of firing temperatures.

Table I

| Firing temperature, °C.: | Resistivity in ohm-centimeters |
|---|---|
| 1325 | $7(10^{10})$ |
| 1350 | $5(10^{10})$ |
| 1375 | $6(10^9)$ |
| 1400 | $6(10^8)$ |
| 1425 | $4(10^7)$ |
| 1450 | $1(10^6)$ |

High electrical resistivity is often desirable in synthetic garnets, as when they are used in microwave apparatus where the property of high resistivity minimizes attenuation of wave energy passing through a garnet used in such apparatus. The high temperature firing necessary in the art at present for producing high-density ceramics is, thus, detrimental to the production of synthetic garnets useful in microwave or other arts where high electrical resistivity is wanted. These losses in resistivity noticed above are believed due to the ease of reduction of ferric ion in the garnets to ferrous ion at sintering temperatures of about 1350° C. or higher, and subsequent electron transfer between the divalent and trivalent ions.

By the method of the present invention, a 2:1 molar ratio of copper and vanadium ions in the form of compounds of these two metals is added to the other ingredients of the ceramic synthetic garnet before firing. As will be seen, such addition is in an amount up to 10 percent by weight of all the metal ions present in the final material. In general, it has been found that improved results are realized with additions as little as 0.4 percent by weight of all the metal ions present in the final material. The presence of these materials permits the sintering of the garnet mixtures at temperatures below those at which electrical resistivity is impaired in the conventional firing techniques, while still promoting full reactivity between the components and high density in the sintered bodies. Sintering temperatures as low as 1200° C. become feasible, and firing generally is done at temperatures below 1350° C. so that serious resistivity losses are not encountered.

The synthetic ceramic garnet materials of most interest for their magnetic properties are yttrium-iron garnets and the rare earth-iron garnets. These have the garnet structure, and the formula $A_3B_5O_{12}$, where A is yttrium, or one or more of the rare earths having an atomic number between 62 and 71 inclusive, or a mixture of yttrium with one or more of the rare-earths mentioned; and B is iron, or iron substituted in part with other trivalent elements such as gallium, aluminum, scandium, indium or chromium. Useful magnetic materials are obtained when one iron atom out of ten (10 atom percent) is substituted with these other metals. With the exception of chromium, the metals may be substituted for iron in amounts up to 20 atom percent. Hereinafter, it is understood that the term "yttrium-iron garnets" includes those materials of the aforementioned formula in which A is yttrium or yttrium mixed with one or more of the rare earths of atomic number between 62 and 71 inclusive, and B is iron, or iron mixed with gallium, aluminum, scandium, indium, or chromium. The term "rare earth-iron garnets" similarly refers to synthetic garnet materials having the formula mentioned above in which A is one or more of the rare earths of atomic number between 62 and 71 inclusive, and B is iron, or iron mixed with gallium, aluminum, scandium, indium, or chromium.

The lattice of the synthetic garnets will accommodate ions whose radii fall within two size ranges. Ions of yttrium and the rare earths of atomic number between 62 and 71 inclusive, all have radii of approximately the same size. The radii are given as being between 0.99 Angstrom unit and 1.13 Angstrom units in the tables of ionic radii, pages 36–37, in Inorganic Chemistry by Fritz Ephraim, Fifth English Edition by P. C. L. Thorne and E. R. Roberts, published by Gurney and Jackson, London, 1948. Recent work on the garnet structure indicates that the radii, as a group, may have smaller numerical values in garnet than those listed by Ephraim. These ions can interchangeably occupy the eight-fold lattice sites in the garnet crystal, and mixtures of two or more of the ions can be substituted in the garnet. Iron has a smaller ionic radius, and occupies the four-fold and six-fold lattice sites in the crystal. The ions of iron, gallium, aluminum, scandium, indium, and chromium are also comparable in size (given by Ephraim as between 0.57 Angstrom unit and 0.83 Angstrom unit, though the range may, again, be contracted in the garnet crystal) and can be substituted one for another in the garnet lattice.

Though the copper and vanadium which are added to the garnets are present essentially entirely as the divalent and pentavalent ions of the respective metals and are balanced electrically by negatively charged oxygen ions in the composition, it is convenient to describe the concentration of their mixture in the garnets in terms of weight of the metal ions alone, ignoring the weight of any anionic species in calculating. In referring to the quantity of added copper and vanadium, it is to be understood that a mixture containing two moles of copper ion to one mole of vanadium ion is always meant. Cupric copper and pentavalent vanadium are added to the garnets in this 2:1 mole ratio to keep an average charge of +3 for each added ion.

According to the invention, one may include in the garnet compositions between about 0.4 percent and 10 percent, by weight of all the metal ions, including those of the additive present in the composition, of a 2:1 mixture of copper and vanadium calculated as metals. Particularly high densities, without loss of electrical resistivity are observed in the synthetic ceramic garnets fired below 1350° C. when between about 0.6 percent and 5 percent of the copper-vanadium mixture is included in the composition. Generally, the larger the amount of copper-vanadium mixture present in the garnet, the lower is the temperature at which the garnet may be fired to high density. Small amounts of copper-vanadium may be added to garnet compositions in conjunction with up to 10 percent (on the same basis of calculation) of cobalt, manganese, and nickel. These latter materials prevent reduction of ferric ion in the garnets at high temperatures, thus inhibiting decreases in resistivity if the copper-vanadium mixture used does not lower the firing temperature completely out of the range in which reduction is a problem.

As mentioned above, the positive charge of the added ions is balanced in the sintered garnet by oxygen ions. In compounding the materials prior to firing, however, any compounds of copper and vanadium convertible to cupric oxide and vanadium pentoxide on firing can be utilized. For example, the carbonates of the metals can be used, and the oxalates, acetates and so forth are equally suitable. Compounds of copper and vanadium in which the metal is present as other than the divalent or pentavalent ion, respectively, may be used if they are convertible to the divalent or pentavalent species on firing above 1200° C.

In making up the garnet mixture prior to firing, appropriate relative amounts of the constituents are weighed out and mixed, with or without a preliminary dry mix, in a paste mixer as a slurry with a fluid in which the solids are insoluble. A ball mill may be used to mix and grind the powdered components. A "Szegvari Attritor" mill, a commercial device utilizing centrifugal forces to aid ball milling has proved an efficient means for mixing and grinding the ceramic powders here considered. More efficient milling with this apparatus permits cutting of milling time by one-half or two-thirds of that needed with conventional ball mills.

Reagent grade compounds are used in the synthesis. Yttrium and the rare earths are usually commercially available as the oxides and high purity ferric oxide is conveniently employed. As before, however, other compounds convertible to the oxides may be used. Liquids in which the solids are insoluble should be used to make the slurry. When water-soluble compounds, such as vanadium pentoxide, are used as the starting materials, liquids such as, for example, acetone, methanol, ethanol, carbon tetrachloride, etc., are conveniently employed, otherwise the slurry may be an aqueous slurry.

After thorough mixing, the paste or slurry is freed of excess liquid by filtration, and the dried material is next calcined in air at a temperature between 800° C. and 1200° C. The calcination takes place in an atmosphere of air, oxygen, mixtures of air and oxygen, or in other gaseous oxidizing media.

After calcination, the fired material is broken into particles, as, for example, by ball milling for a period of 1 hour to 15 hours in water, or some other liquid such as ethanol, carbon tetrachloride, or acetone if water-soluble components have been used. Shorter periods of ball milling are sufficient with more efficient milling apparatus.

An optional second calcination may be carried out at this point, under the same conditions as the first and followed, like the first, by a ball milling. Whether a second calcining and grinding follow or not, the calcined product should eventually be brought by milling with a liquid, to the form of a sludge of thick but fluid consistency. For example, such a sludge may comprise one part by volume of solids, ground to an average size of about one micron, mixed with one part by volume of fluid. Ball milling for the suggested period of time usually produces particles between 0.5 micron and 10 microns in size, which will be suitable for sludge formation. One part by volume of these solids can be mixed with between 0.5 part and 5 parts of fluid for example, depending on the most convenient consistency for sludge pressing with the equipment used therefor.

The sludge is next formed by conventional pressing techniques into the desired body shape. For example, the material can be pressed in a commercial filter press, such as those manufactured by the Carver Filter Press Company of Summit, New Jersey. Pressures are not critical, so long as a majority of the liquid is expressed, and a solid body which holds its shape is formed.

Other shaping methods than filter pressing may also be employed. For example, the solids may be dry pressed. In this technique, which is known in the ceramic arts, a binder and lubricant are incorporated into the ceramic solids during the ball milling. Polyvinyl alcohol or "Opal Wax" (hydrogenated castor oil) are useful binders when ball milling with water, and paraffin or "Halowax" (chlorinated naphthalene) are useful when milling with nonaqueous solvents, such as carbon tetrachloride. The binder may be added either as a solid, in which case it is dissolved by the fluid used in the milling, or already in solution in a solvent. For "Halowax," which is most commonly used, an amount of wax equal in weight to 10 percent of the weight of the ceramic solids has been found to give best results. For the other binders mentioned, smaller quantities are usual.

In the dry press process, the solvent, after milling, may be removed by filtration or by evaporation while the ceramic and binder residue are stirred to assure uniform dispersion of the binder throughout the inorganic mixture. The resultant dried powder is then preferably granulated for later ease in pressing. This is conveniently accomplished by forcing the mixture through a sieve, for example, and a No. 20 Standard sieve, with a mesh opening of 0.85 millimeters, has been used for this purpose with particularly good results.

Forming of the bodies is then done by compressing the materials in dies, under pressures of from 10,000 to 50,000 pounds per square inch. After forming, the pressed bodies may be, at option, dewaxed, by heating at a temperature of about 400° C., after bringing the bodies to temperature over a 6-hour period, or the formed bodies may be fired finally without an intermediate dewaxing step.

After shaping by filter pressing, dry pressing, or other conventional methods, the bodies are given a final firing or sintering in air, oxygen, a mixture of these, or some other oxidizing atmosphere. The final firing temperature may be between 1200° C. and 1350° C. Particularly good results are obtained when the final firing is in the temperature range between 1250° C. and 1325° C. Because of the addition of copper and vanadium to the composition, high density samples are produced, which have resistivity values above $10^{12}$ ohm-centimeters, though sintering has been carried out at temperatures below 1350° C.

In the temperature ranges described above, firing times can range between 1 hour and 40 hours, depending on the temperature employed, the amount of copper-vanadium mixture added, and the density desired in the fired body. In general, for firing at a given temperature, a sample containing a greater proportion of copper vanadium than another will fire to a higher density product in a shorter firing time.

The method of practicing the invention is shown by the following illustrative example.

EXAMPLE 1

One-thirtieth mole of an yttrium-iron garnet of the approximate formula $$(3Y_3Fe_5O_{12})\ 0.9625\ (Cu_{16}V_8O_{36})\ 0.0375$$

is prepared by mixing together 32.5 grams of $Y_2O_3$, 38.3 grams $Fe_2O_3$, 2.46 grams of $CuCO_3$ and 0.91 grams of $V_2O_5$ for ten minutes, with methanol, in a "Szegvari Attritor" mill. The composition contains a 2:1 molar mixture of copper and vanadium ions, which mixture constitutes about 3.3 percent by weight of all the metal ions present in the composition. The mixture was filtered to remove excess methanol, and the calcined at 950° C. in air for three hours. The calcined product was then ball milled (20 minutes in the "Szegvari Attritor" mill) with carbon tetrachloride containing 10 percent by weight of "Halowax." After milling, the crushed product was dried by evaporating the solvent below 100° C., while stirring the mass constantly to expose fresh surface. The dried powder was then screened through a No. 20 Standard screen. Parts were pressed from the screened fines using dies and pressures of about 20,000 pounds per square inch. The pressed pieces were dewaxed by heating for 6 hours at 400° C., after bringing the furnace to temperature over a 6-hour period. The parts were then fired for 20 hours in oxygen at a temperature of 1300° C. The density of the material was 5.1 grams per cubic centimeter, the saturation induction (4IIM) had a value of about 1800 gausses, and the resistivity of the materials was greater than $10^{12}$ ohm-centimeters.

What is claimed is:

1. The method of preparing yttrium-iron and rare earth-iron oxides having a garnet structure and of the formula $A_3B_5O_{12}$ where O is oxygen, A is at least one element selected from the group consisting of yttrium and the rare earths having an atomic number between 62 and 71 inclusive, and B is iron containing at least one element selected from the group consisting of gallium, aluminum, scandium, indium and chromium, said gallium, aluminum, scandium, and indium being present in an amount from 0 to 20 atom percent and said chromium being present in an amount from 0 to 10 atom percent, which comprises adding to the uncalcined components of said oxides a 2:1 molar mixture of divalent copper and pentavalent vanadium ions in the form of compounds convertible to the metal oxides on firing, said ions being added in an amount between 0.4 percent and 10 percent by weight of all the metal ions present in the final material, and firing the resultant composition in an oxidizing atmosphere at a temperature between about 1200° C. and 1350° C. for between about one hour and forty hours.

2. The method in accordance with claim 1 wherein there is included within a body of said oxide between 0.4 percent and 5 percent by weight of the metal ions present of a mixture of copper and vanadium ions.

3. The method in accordance with claim 1 wherein there is included within a body of said oxide between 0.6 percent and 5 percent by weight of the metal ions present of a mixture of copper and vanadium ions.

4. A ceramic body having a resistivity of at least $7 \times 10^{10}$ ohm-centimeters selected from the group consisting of yttrium-iron and rare earth-iron oxides having a garnet structure and of the formula $A_3B_5O_{12}$ where O is oxygen, A is at least one element selected from the group consisting of yttrium and the rare earths having an atomic number between 62 and 71 inclusive, and B is iron containing at least one element selected from the group consisting of gallium, aluminum, scandium, indium and chromium, said gallium, aluminum, scandium, and indium being present in an amount from 0 to 20 atom percent and said chromium being present in an amount from 0 to 10 atom percent, which body contains between 0.4 percent and 10 percent by weight of all the metal ions present of a 2:1 molar mixture of divalent copper and pentavalent vanadium ions present in the body as the oxides of these metals, said body being formed by adding said molar mixture of divalent copper and pentavalent vanadium in the form of compounds convertible to the metal oxides on firing to the uncalcined components of said yttrium-iron and rare earth-iron oxides and firing the resultant composition in an oxidizing atmosphere at a temperature between about 1200° C. and 1350° C. for between about one hour and forty hours.

5. The ceramic body in accordance with claim 4 wherein said oxide contains between 0.4 percent and 5 percent, by weight of the metal ions present, of a mixture of copper and vanadium ions in which mixture the molar ratio of copper to vanadium is approximately 2:1.

References Cited in the file of this patent

UNITED STATES PATENTS

| | | |
|---|---|---|
| 2,565,861 | Leverenz et al. | Aug. 28, 1951 |
| 2,576,456 | Harvey et al. | Nov. 27, 1951 |
| 2,656,319 | Berge | Oct. 20, 1953 |
| 2,659,698 | Berge | Nov. 17, 1953 |
| 2,685,568 | Wilson | Aug. 3, 1954 |
| 2,714,580 | Dean et al. | Aug. 2, 1955 |
| 2,715,109 | Albers-Schoenberg | Aug. 9, 1955 |

FOREIGN PATENTS

| | | |
|---|---|---|
| 763,494 | Great Britain | Dec. 12, 1956 |
| 525,700 | Canada | May 29, 1956 |

OTHER REFERENCES

Maxwell et al.: Physical Rev., December 15, 1954, pp. 1501–1504.

Calhoun et al.: Physical Rev., August 15, 1957, pp. 993, 994.

Economos: J. Amer. Ceramic Soc., July 1955, p. 242.

J. of the Inst. of Electrical Engineers, Japan, November 1937, p. 5, June 1939, pp. 276, 277, 279.

Bradley: Ceramic Age, October 1957, pages 29 and 30.